(12) United States Patent
Wilcox

(10) Patent No.: US 7,967,261 B2
(45) Date of Patent: Jun. 28, 2011

(54) INTERNAL TELESCOPIC TUBE LOCKING DEVICE

(76) Inventor: James F. Wilcox, Jackson, WY (US)

( * ) Notice: Subject to any disclaimer, the term of this patent is extended or adjusted under 35 U.S.C. 154(b) by 581 days.

(21) Appl. No.: 11/342,121

(22) Filed: Jan. 26, 2006

(65) Prior Publication Data
US 2006/0175502 A1    Aug. 10, 2006

Related U.S. Application Data

(63) Continuation of application No. 10/691,340, filed on Oct. 22, 2003, now abandoned.

(60) Provisional application No. 60/420,126, filed on Oct. 22, 2002.

(51) Int. Cl.
F16M 11/26    (2006.01)
F16B 7/10    (2006.01)

(52) U.S. Cl. ............... 248/188.5; 248/412; 403/109.5

(58) Field of Classification Search ............ 248/125.8, 248/200.1, 326, 333, 337, 411, 412, 188.5, 248/407, 414, 430; 403/109.3, 109.4, 109.2, 403/109.5, 109.8
See application file for complete search history.

(56) References Cited

U.S. PATENT DOCUMENTS

| | | | | |
|---|---|---|---|---|
| 1,103,839 A * | 7/1914 | Rellay | ............... | 248/412 |
| 1,818,977 A * | 8/1931 | Gray | ............... | 292/275 |
| 2,291,747 A * | 8/1942 | Neuwirth | ............... | 248/188.5 |
| 4,113,222 A * | 9/1978 | Frinzel | ............... | 248/412 |
| 5,897,268 A * | 4/1999 | Deville | ............... | 403/109.5 |
| 6,050,531 A * | 4/2000 | Wilcox | ............... | 248/188.5 |
| 6,343,404 B1 * | 2/2002 | Kuo | ............... | 16/113.1 |
| 6,698,698 B1 * | 3/2004 | Hsieh | ............... | 248/125.8 |
| 7,398,952 B2 * | 7/2008 | Carnevali | ............... | 248/404 |

* cited by examiner

Primary Examiner — Tan Le
(74) Attorney, Agent, or Firm — Zarian Midgley & Johnson PLLC

(57) ABSTRACT

A locking device for multiple-section telescoping tubes wherein a smaller tube is telescopically retractable into or extensible from within a larger tube includes a pair of opposing blocks, disposed within the telescoping tubes, one block being attached to the smaller tube, the other block being configured to move laterally with respect to the first block when the blocks are moved longitudinally with respect to each other. Depending on the direction of longitudinal movement of the blocks, one block may be caused to bear against an inner side of the larger tube to resist retraction of the smaller tube, or the blocks may be allowed to move away from the inner side of the larger tube to allow free sliding extension of the smaller tube. The device also includes means for selectively longitudinally moving one of the blocks with respect to the other, so as to allow free sliding retraction of the smaller tube, when desired.

20 Claims, 3 Drawing Sheets

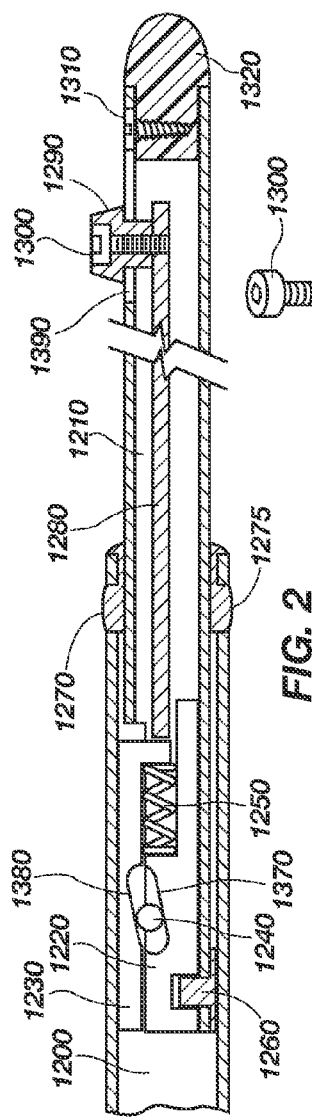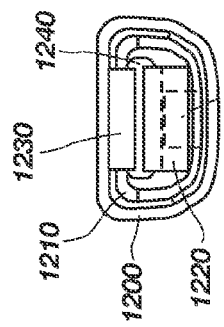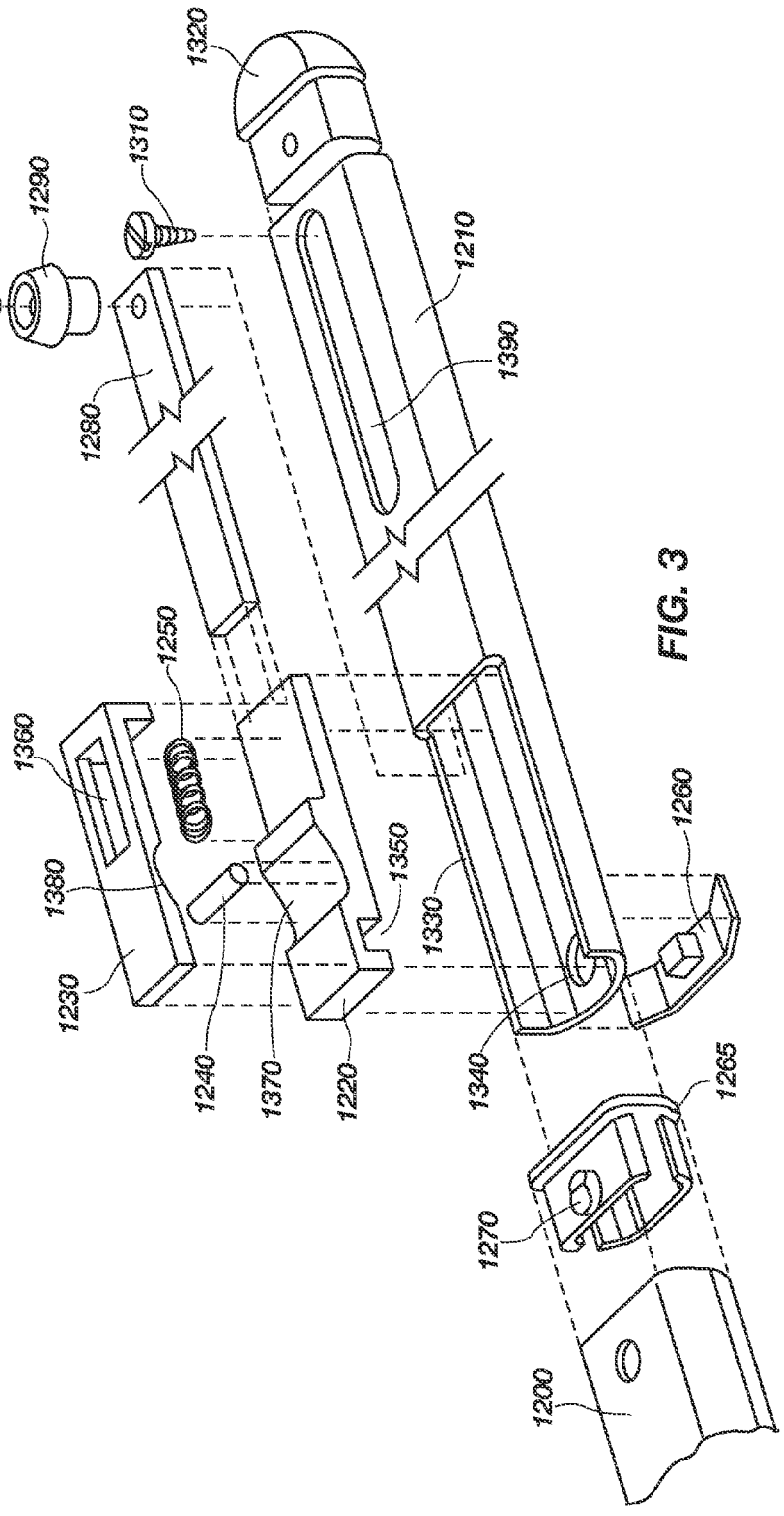

INTERNAL TELESCOPIC TUBE LOCKING DEVICE

The present application is a continuation of U.S. nonprovisional patent application Ser. No. 10/691,340, filed on Oct. 22, 2003, which claims priority from U.S. provisional patent application Ser. No. 60/420,126, filed on Oct. 22, 2002, the disclosure of which is incorporated herein by reference in its entirety.

BACKGROUND OF THE INVENTION

1. Field of the Invention

The present invention relates generally to extendable support members. More particularly, the present invention relates to an internal locking device for telescopic tube sections that provides secure locking and does not require a release mechanism to be extended.

2. Related Art

There are many types of support devices that utilize telescoping support legs, especially where the support devices are intended to be easily portable. Such support devices include tripods, tables, easels, etc. Likewise, there are many forms of locking devices for telescoping support legs for these devices. One such leg-locking mechanism is disclosed in U.S. Pat. No. 6,050,531, the disclosure of which is incorporated herein by reference in its entirety. Many such locking devices use clamp and bolt mechanisms, spring-loaded pins and holes, cam-lock devices, wing nut-operated clamps, threaded collar clamps, internal threaded studs, resilient washers, etc. Many of these require rotation of a collar or of an individual leg section in order to lock or un-lock it from a given position. Some of them do not allow adjustable extension of the legs, but allow fixation of a leg only in designated positions. Others require external protrusions and parts that can fall off and become lost.

Additionally, some telescoping tube leg-locking devices are cumbersome and time-consuming to use, requiring several complicated maneuvers to lock or unlock a leg segment. Some prior leg-locking devices also require telescoping leg sections of a particular cross-sectional shape. Moreover, some have locking mechanisms that can be relatively easily forced to move when in the locked position, thus producing extreme wear, and reducing the useful life of the device.

SUMMARY OF THE INVENTION

The present invention advantageously provides a telescopic tube leg-locking apparatus wherein the legs may be extended simply by pulling, and do not require a release mechanism.

The present invention also provides a telescopic tube leg-locking apparatus that sequentially unlocks multiple tube or leg sections by actuating a single unlocking device to retract the legs to a telescope close position.

The invention also provides a telescopic tube leg-locking apparatus that allows multiple tubes of any cross-section to be locked and released.

The invention also provides a telescopic tube leg-locking apparatus that is suitable for tubes of various cross-sectional shapes, and provides secure locking that is more difficult to force to move when in the locked position, and thus reduces wear on the device.

In accordance with one embodiment thereof, the invention provides a locking device for multiple-section telescoping tubes wherein a smaller tube is telescopically retractable into or extensible from within a larger tube. The locking device includes a pair of opposing blocks, disposed within the telescoping tubes, one block of the pair being attached to the smaller tube, the other block of the pair being configured to move laterally with respect to the first block when the blocks are moved longitudinally with respect to each other. Depending on the direction of longitudinal movement of the blocks, one block may be caused to bear against an inner side of the larger tube to resist retraction of the smaller tube, or the blocks may be allowed to move away from the inner side of the larger tube to allow free sliding extension of the smaller tube. The device also includes means for selectively longitudinally moving one of the blocks with respect to the other, so as to selectively allow free sliding retraction of the smaller tube, when desired.

Additional features and advantages of the invention will be apparent from the detailed description which follows, taken in conjunction with the accompanying drawings, which together illustrate, by way of example, features of the invention.

BRIEF DESCRIPTION OF THE DRAWINGS

FIG. 1 is an end cross-sectional view of telescoping tube segments in one embodiment of the present invention.

FIG. 2 is a side cross-sectional view of the assembly of FIG. 1, showing the parts as assembled in the smaller two sections of a telescoping tube set.

FIG. 3 is an exploded view of the embodiment of FIGS. 1 and 2, showing how the various parts are assembled.

DETAILED DESCRIPTION

Figure 4:
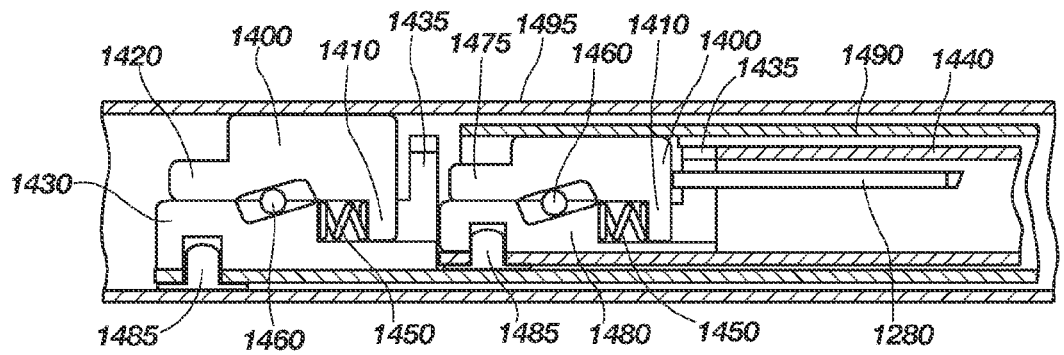
FIG. 4 is a side cross-sectional view of an embodiment of the telescoping tube leg-locking device configured for round tubes.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Referring to FIGS. 1-3, the invention comprises an internal locking mechanism having a ramp block 1220, a release block 1230, a release rod 1280, and a roller 1240. The ramp block includes a ramp surface 1370, and the release block includes an opposing ramp surface 1380. The roller is disposed between the opposing ramp surfaces. Pressure of an optional spring 1250 (or gravity, if the tubes 1200, 1210 are vertical, with foot 1320 down) biases the release block in the locked position (toward the right in the figures), causing the roller to move up along the ramp surfaces so as to force the release block away from the ramp block and against the inner surface of the outer tube 1200. Any action that would attempt to move the smaller inner tube 1210 into the larger outer tube increases pressure of the release block against the inside of the larger tube, thus increasing the locking force holding the tubes in place.

Figure 9:
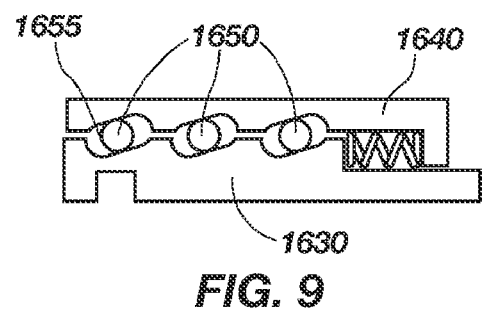

While the embodiment of FIGS. 1-3 includes a single roller disposed between two opposing ramp surfaces, multiple rollers and multiple corresponding ramp surfaces can be used to multiply force or provide redundant structure, if desired. For example, as shown in FIG. 9, the ramp block 1630 includes three ramp surfaces, and the release block 1640 also includes three opposing ramp surfaces. Disposed between these ramp surfaces are three rollers 1650. These rollers function in the same manner as the roller 1240 in FIGS. 1-3. It will be apparent that any number of ramp/roller combinations can be used. Additionally, while the ramp surfaces 1370, 1380 are shown as being angled with respect to the length of the telescoping tubes, either or both opposing ramp surfaces need not be angled, as will be apparent from the discussion of alternative embodiments below.

The smaller inner tube 1210 can easily be extended without release by just pulling it out, with or without using the release button 1290. To retract, the user slides the release button to the left. The release button is attached to a release rod 1280, which pushes against the release block 1230, moving it to the left in a slot 1390, allowing the roller 1240 to move into a deeper part of the opposing ramps 1380 and 1370. This relieves pressure of the release block against the inside of the outer tube 1200, allowing the smaller tube to slide into the larger tube. Any number of tubing sections can be used, with each release block releasing the next section when the release button is continually depressed. Alternatively, each section could release the next, so that release is only needed until the first section is fully retracted, after which the sections sequentially release each other without continual pressure on the release button. It will be apparent that where each section releases the next, some portion of the length of each section will need to be extended during use to keep the leg from collapsing.

As shown in FIG. 3, a plastic slide 1260 acts as a spacer between the inner tube 1210 and the outer tube 1200, and also keeps the ramp block 1220 from sliding left or right. This slide is inserted through a hole 1340 and into a slot 1350 in the ramp block. A plastic glide 1265 acts as a spacer between the tubes, and is inserted into the end of the outer tube. Round buttons 1270 and 1275 protrude from the glide, and snap into holes in the outer tube to secure the glide in place. At full extension of the smaller inner tube 1210, the upper right corner of the release block 1230 hits the left edge of the plastic glide, which acts as stop to keep the smaller tube from sliding entirely out of the larger tube 1200. An outward bulge on the button 1270 also provides constant pressure between the outer tube and a next larger size tube (not shown) to help keep the leg retracted when stored.

Shown in FIG. 4 is a side, cross-sectional view of an alternative embodiment of the present invention configured for tubes 1440, 1490, 1495 having a round cross-section. In this embodiment, the release portion 1420 of the release block 1400 is in the center of the release block, and serves to actuate a spring stop 1410, also centered. Consequently, the tubes can axially rotate relative to each other and still release. A stop ring 1435 stops the smaller tube and its associated ramp block 1480 regardless of radial orientation, but allows the release extension 1475 (corresponding to 1420) to pass through to push the next succeeding release block 1400 to the left, thus releasing it. Alternatively, the slide 1485 can keep the ramp from rotating so that the stop ring 1435 is not needed.

Figure 5:
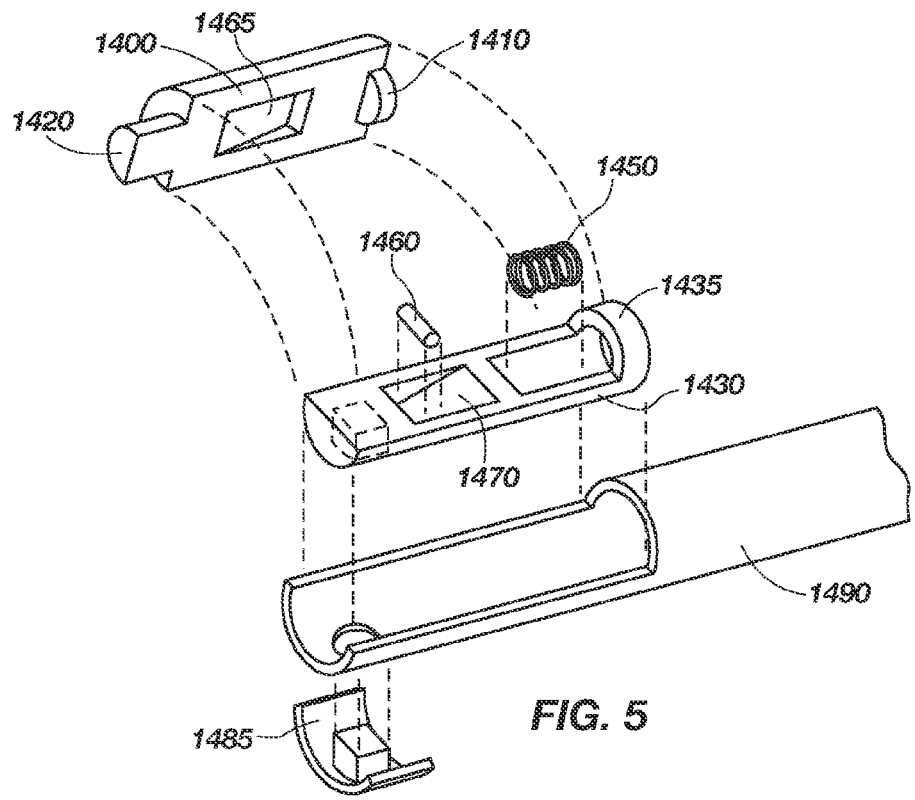
FIG. 5 is an exploded view of the embodiment of FIG. 4.
Figure 6:
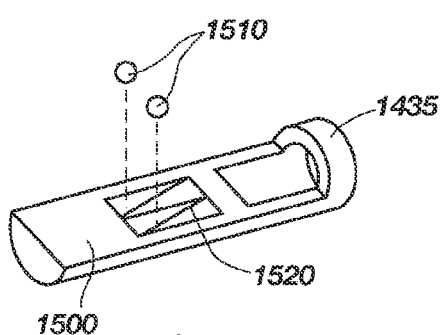
FIG. 6 is a perspective view depicting another variation of a ramp block compatible with the system of FIG. 4, wherein the ramp block has tapered slots configured to receive spherical rollers.
Figure 7:
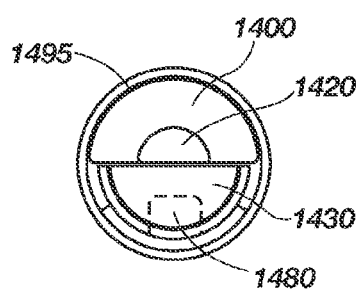
FIG. 7 is an end view of the ramp block of FIGS. 4-5 or FIG. 6.

The embodiment of FIG. 4 includes a cylindrical roller 1460 and flat ramp 1470. However, another embodiment of the round tube leg-locking device shown in FIG. 6 comprises a ramp block 1500 having one or more tapered slots 1520, with a spherical roller 1510 (i.e. a ball bearing) in each slot, rather than the cylindrical roller and straight ramp combination of FIG. 5. With this version, similar slots would also be provided in a corresponding release block (not shown). One advantage of the embodiment shown in FIGS. 6 and 7 is that it allows for either multiple balls or a roller, and it is designed for multiple sections, thus the stop-ring 1435 and release extension 1475 (corresponding also to 1420 in FIGS. 4 and 5) are added. These modifications allow the leg locking mechanism in an upper tube to stop the leg locking mechanism of a lower tube without releasing the upper release block (1400 in FIG. 4), unless the release rod 1280 pushes the release extension through the stop-ring, putting pressure on the upper release block.

Depicted in FIGS. 8-14 are various other embodiments of internal locking mechanisms in accordance with the present invention. No tubes are shown in these variations, but they would function in a similar way to the parts in FIG. 2. The variations shown in FIGS. 8 through 14 function essentially the same as those of FIGS. 1-3 and 4-7, with the main difference being how they spread the ramps and release elements apart. Each of these alternative variations use different roller and ramp configurations to apply pressure to the inside of the outer tube when the (lower) ramp block is confined in the smaller tube, and the (upper) release block presses against the inside of the outer tube.

Figure 8:
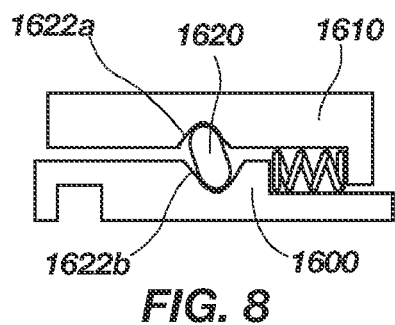
FIGS. 8-14 are side views of various other embodiments of the internal locking mechanism in accordance with the present invention.
Figure 10:
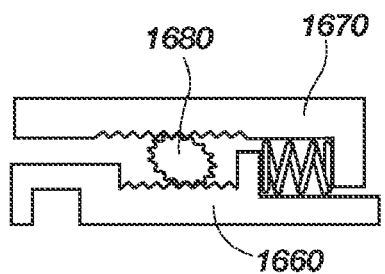

The embodiment of FIG. 8 comprises an eccentric (i.e. non-cylindrical) roller 1620 disposed between a ramp block 1600 and release block 1610. In this embodiment, the ramp surfaces of the ramp block and release block comprise roller pockets 1622a, 1622b that hold the eccentric roller in place. The eccentric roller acts as a cam to push the release block away from the ramp block when the ramp block moves to the left relative to the release block, causing pressure on the inside of the larger tube. The embodiment of FIG. 10 is similar to that of FIG. 8, but comprises a roller that is an eccentric gear 1680 that mates with geared or toothed ramp surfaces on the ramp block 1660 and release block 1670. Advantageously, because the shape of the roller provides the desired cam action to push the ramp block and release block away from each other, the ramp surfaces need not be angled with respect to the long axis of the telescoping tubes.

Figure 11:
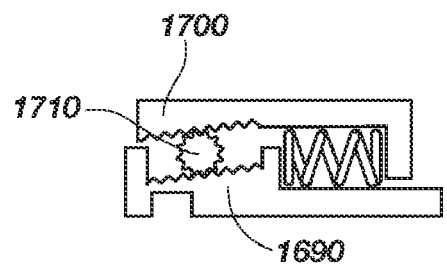
Figure 12:
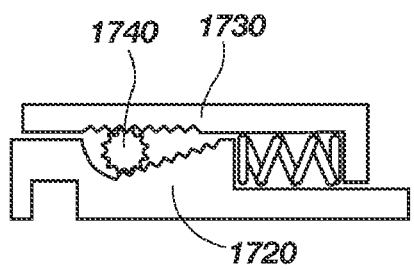

The embodiments of FIGS. 11 and 12 also use rollers and ramp surfaces having intermeshing gear-like teeth. The embodiment of FIG. 11 includes angled opposing ramp surfaces 1690 and 1700 with gear tooth surfaces, and a round geared roller 1710. The embodiment functions like that of FIG. 2, except that the intermeshing gear teeth substantially prevent slippage between the roller and the ramp surfaces. The embodiment of FIG. 12 has an angled geared ramp on the ramp block 1720, disposed opposite a non-angled geared ramp on the release block 1730. A round geared roller 1740 is disposed between the two ramp surfaces to provide the outward locking force.

Figure 13:
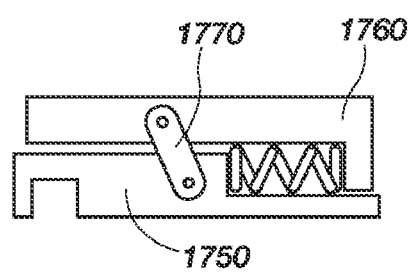
Figure 14:
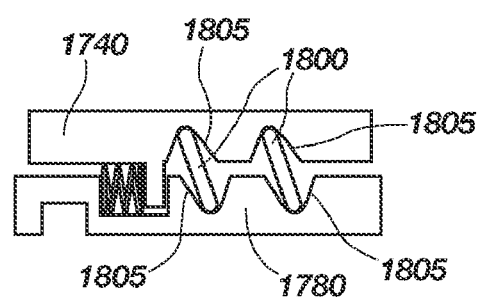

The embodiments of FIGS. 13 and 14 are also similar to that of FIG. 8 in that a cam-type action is used. In the embodiment of FIG. 14, the rollers comprise angled plates 1800 disposed in pockets 1805 formed in the ramp block 1780 and release block 1790. The angled plates produce a cam-type action that causes the release block to move toward the inner surface of the outer tube (not shown) as the release block moves to right relative to the ramp block. Finally, the embodiment of FIG. 13, incorporates a roller system comprising a hinge plate 1770 pivotally attached on each side (the one shown and an identical one on the opposite side) of the ramp block 1750 and release block 1760, so that as the ramp block and release block translate with respect to each other, the hinge plates pivot and cause the release block to move toward or away from the ramp block to provide a cam-locking action. It will be apparent that other variations are also possible.

Each of the variations in FIGS. 8-14 also allow release with a release mechanism similar to that of FIG. 2, and comprise single or multiple locking mechanisms, as well as varied spring positions. For example, the spring can be located at either end of the ramp block and release block combination, as seen by comparing FIG. 14 with FIG. 11, for example. Alternatively, a spring could be disposed between opposing ramp surfaces, adjacent to a roller, such as at position 1655 in FIG. 9. Other variations are also possible.

Advantageously, if extrusions are used to make the ramp block, the release block, and the roller for the various embodiments shown, these parts can be cut to the same length (e.g. 1"), which makes manufacture and assembly simpler. Viewing FIG. 14, for example, plates 1800 have the cross-section shown, and they would be rectangles 1" wide by about ½" tall, as shown. One exception to this is the embodiment of FIG. 13, where the roller comprises two hinge plates 1770 that are pivotally connected with pins through holes in the release block and ramp block, so as to hinge them together.

The present invention provides many advantages over the prior art. Viewing FIGS. 1-3, unlike the prior art, the release rod 1280 is not connected to the release block 1230, such that the release button 1290 need not be used to extend legs sections as well as retract them. Additionally, the retaining button 1270 of the leg glides 1265 is tapered on the top to increase friction when the larger leg 1200 is retracted into the next larger section, so that it will not slide out of the next larger section when retracted, unless additional force is applied to pull it out.

Another advantage of the present design is that the cutout 1330 in the leg tube 1210 is simpler and can be cut out with a band saw instead of a milling machine, thus lowering production costs. Assembly of the ramp 1220 and release block 1230 is also somewhat easier than in the prior art, also reducing cost and complexity. Finally, the surface area of the release block 1230 that presses against the outer tube is larger than the surface of a roller alone, thus eliminating or reducing distortion of the thin-walled tubing that is more likely with a roller acting directly on the inside of the tube.

As in the '531 patent, this design allows multiple leg sections to be telescopically connected, instead of just two leg sections. Some prior devices utilize similar mechanisms, but cannot be adapted to more than two leg sections. Similarly, some other prior leg locking systems can be used with multiple sections, but employ significantly different leg-locking mechanisms. Additionally, also as in the '531 patent, locking is automatic as legs are extended, without the need for a release. Releasing to retract leg sections is either automatic when they are brought to parallel positions, or it is accomplished with a single motion by sliding a release toward the larger diameter sections, collapsing each section in turn. With the present invention, however, multiple tubes of any cross section can be locked and released.

With this design, while the roller is unlikely to wear, the spring or gravity bias of the release plate will probably cause a very small amount of wear on the plate itself and on the inside of the tube. However, the wear will be very slight, and is likely to be noticeable only if the apparatus is used often for a very long time—probably much longer than the life of the user. Additionally, the design automatically compensates for wear, because the movement of the roller (and hence the locking position) depends on the actual geometry of the ramp and release, not the intended geometry of those parts. Furthermore, any shape tube can be accommodated with spherical or cylindrical rollers in variations of this design.

By way of example, in one embodiment the invention can be described as a telescopic tube locking device for multiple-section telescopic tubes. The device comprises a first tube section, and a second tube section slidably assembled over the first tube section, the first tube being configured to selectively extend from or retract into the second tube section. A clamping assembly is disposed within the first tube section, and includes (1) a ramp block fixedly attached to the first tube section, the ramp block having a first ramp surface, (2) a movable release block slidably disposed opposite the ramp block and having a second ramp surface, and (3) a roller disposed between the first and second ramp surfaces. The ramp block and release block are configured such that relative translation of the release block in a first direction rolls the roller up the first and second ramps so as to lock the clamping assembly, and relative translation in a second direction rolls the roller down the ramps so as to release the clamping assembly and allow sliding of the first tube within the second tube. A spring is disposed between the ramp block and release block to bias the release block in the first direction. The first tube section includes a push rod assembly slidably disposed therein and configured to contact the release block to push it in the second direction against the spring. The clamping assembly is configured to release when (1) the push rod is used to push the release block, and (2) when the first tube is pulled in a direction to extend it from the second tube.

As another more detailed example, the device may include a second clamping mechanism associated with a third tube section disposed around the second tube section. The release block includes a release extension configured to contact a second release block of the second clamping mechanism, so as to allow sequential retraction of the second tube section into the third tube section following retraction of the first tube section into the second tube section.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. A telescopic tube device, comprising:
at least three slidable telescoping tube sections, including an inner tube section, a middle tube section, and an outer tube section;
a clamping mechanism, associated with each of the inner and middle tube sections, respectively, each clamping mechanism including a ramp block with a first ramp surface, a release block with a second ramp surface opposite the first ramp surface, and a roller disposed therebetween, in bearing contact between the first and second ramp surfaces, the clamping mechanism having a released position allowing free sliding of adjacent tube sections, and a frictionally engaged position against the next outer adjacent tube section, resisting sliding of adjacent tube sections in a retracting direction;

a release mechanism, configured to selectively move the clamping mechanism of the inner tube section to the released position; and a release extension, extending from the clamping mechanism of the inner tube section, positioned to contact and move the clamping mechanism of the middle tube section to the released position when (i) the inner tube section is substantially completely retracted into the middle tube section, and (ii) the clamping mechanism of the inner tube section is in the released position.

2. A device in accordance with claim 1, wherein the release mechanism comprises a push rod, slidably disposed within the inner tube section, configured to contact the clamping mechanism of the inner tube section to push it in the release direction.

3. A device in accordance with claim 1, wherein the clamping mechanism of the middle tube section includes a stop ring, positioned to receive contact from the clamping mechanism of the inner tube section without respect to the relative axial orientation thereof.

4. A device in accordance with claim 1, wherein the telescoping tube sections have a substantially circular cross-section.

5. A device in accordance with claim 1, wherein
the release block includes an outer surface in frictional contact with the next outer tube section; and
the roller is oriented to laterally spread the respective ramp block and release block apart to press the outer surface of the ramp block against an inner surface of the next outer tube section when in the engaged position, and to allow the respective ramp block and release block to laterally close together when in the released position.

6. A device in accordance with claim 5, wherein the roller is selected from the group consisting of substantially cylindrical rollers, substantially spherical rollers, rollers having an eccentric cylindrical cross-section, cylindrical rollers with gear-type teeth, eccentric cylindrical rollers with gear-type teeth, rocker plates, and a hinge plate pivotally interconnecting the ramp block and release block.

7. A device in accordance with claim 5, wherein the roller is substantially spherical, and the first and second ramp surfaces comprise tapered slots, configured to receive the spherical roller.

8. A device in accordance with claim 5, wherein the roller comprises gear-type teeth, and the first and second ramp surfaces comprise gear-type teeth configured to intermesh with the teeth of the roller.

9. A device in accordance with claim 5, wherein at least one of the first and second ramp surfaces are non-angled with respect to the telescopic tubes.

10. A device in accordance with claim 5, wherein the roller comprises at least two rollers, each disposed between opposing ramp surfaces.

11. A device in accordance with claim 5, wherein the roller has an eccentric cross-section configured to produce a cam-type action between the ramp surfaces when rotated.

12. A device in accordance with claim 11, wherein the roller comprises gear-type teeth, and the first and second ramp surfaces comprise gear-type teeth configured to intermesh with the teeth of the roller.

13. A device in accordance with claim 11, wherein the ramp block and release block include a pocket for holding opposing edges of the roller.

14. A telescopic tube locking device for multiple-section telescopic tubes, comprising:
a first tube section, having an inside surface;
a second tube section, having an inside surface, slidably disposed within and configured to selectively extend from or retract into the first tube section;
a third tube section, having an inside, slidably disposed within and configured to selectively extend from or retract into the first tube section;
first and second clamping assemblies, attached within the second and third tube sections, respectively, each clamping assembly having a locked position and a released position, and including
a ramp block, fixedly attached within the respective tube section, the ramp block having a first ramp surface;
a release block, having an outer surface, moveably disposed opposite the ramp block, having a second ramp surface opposite the first ramp surface, and a release extension, extending from a proximal end of the release block;
a roller, rollably disposed in bearing contact between the first and second ramp surfaces of each clamping assembly, respectively, oriented to laterally spread the respective ramp block and release block apart to lock the clamping assembly upon translation of the release block in a locking direction, and to allow the respective ramp block and release block to laterally close together to release unlock the clamping assembly upon translation of the release block in a release direction; and
a release mechanism, configured to move the release block of the second clamping assembly in the release direction, and thereby extend the release extension to a position to contact and move the release block of the first clamping assembly in the release direction upon substantially complete retraction of the third tube section into the second tube section.

15. A device in accordance with claim 14, wherein the outer surface of the release block of the first clamping assembly is positioned in frictional contact with the inside surface of the first tube section, and the outer surface of the release block of the second clamping assembly is positioned in frictional contact with the inside surface of the second tube section.

16. A device in accordance with claim 15, wherein friction between the outer surface of the release blocks and the inside surface of the respective tube sections tends to push the respective release blocks in the release direction during extension of the tube sections, and tends to push the release blocks in the locking direction during retraction of the tube sections.

17. A device in accordance with claim 14, wherein the roller is selected from the group consisting of substantially cylindrical rollers, substantially spherical rollers, rollers having an eccentric cylindrical cross-section, cylindrical rollers with gear-type teeth, eccentric cylindrical rollers with gear-type teeth, rocker plates, and a hinge plate pivotally interconnecting the ramp block and release block.

18. A locking device for multiple-section telescoping tubes comprising an outer tube, an inner tube, and an innermost tube, the tubes being telescopically retractable into or extensible from within each other, the locking device further comprising:
a ramp block and release block pair, disposed within each of the inner and innermost tubes, each ramp block being attached to and enclosed within the respective tube, each release block being disposed opposite the respective ramp block, with a roller rollably disposed between and in contact with opposing ramp surfaces of the ramp block and release block, respectively, the release block being configured to move laterally toward or away from the ramp block when the blocks of a pair are moved longitudinally with respect to each other, so as to (i) press the release block against an inner surface of the next larger tube, and (ii) withdraw the release block from against the inner side of the next larger tube to allow free sliding extension of the telescoping tubes;

means for selectively longitudinally moving the release block of the innermost tube with respect to the corresponding ramp block, so as to selectively allow sliding retraction of the innermost tube; and a release extension, extending from the release block of the innermost tube, configured to contact and longitudinally move the release block of the inner tube to withdraw the release block of the inner tube from against the inner side of the next larger tube, to cause sequential sliding retraction of the telescoping tubes.

19. A device in accordance with claim 18, wherein the inner tube section includes a stop ring, positioned to receive contact from the release extension without respect to the relative axial orientation of the release extension.

20. A device in accordance with claim 19, wherein the telescoping tube sections have a substantially circular cross-section.

* * * * *